United States Patent [19]

Hepburn

[11] Patent Number: 5,771,685
[45] Date of Patent: Jun. 30, 1998

[54] METHOD FOR MONITORING THE PERFORMANCE OF A $NO_x$ TRAP

[75] Inventor: Jeffrey Scott Hepburn, Dearborn, Mich.

[73] Assignee: Ford Global Technologies, Inc., Dearborn, Mich.

[21] Appl. No.: 733,079

[22] Filed: Oct. 16, 1996

[51] Int. Cl.$^6$ .................................................... F01N 3/20
[52] U.S. Cl. ................................. 60/274; 60/276; 60/277; 60/297; 60/301
[58] Field of Search ............................ 60/274, 276, 277, 60/297, 301, 311

[56] References Cited

U.S. PATENT DOCUMENTS

| | | | |
|---|---|---|---|
| 5,402,641 | 4/1995 | Katoh et al. ........................... | 60/277 X |
| 5,437,153 | 8/1995 | Takeshima et al. ...................... | 60/276 |
| 5,483,795 | 1/1996 | Katoh et al. ............................. | 60/276 |

Primary Examiner—Tony M. Argenbright
Attorney, Agent, or Firm—Allan J. Lippa; Roger L. May

[57] ABSTRACT

A method and apparatus for on-board monitoring of $NO_x$ trap performance is proposed that uses two HEGO sensors, one positioned upstream of the $NO_x$ trap, and the other positioned downstream of the $NO_x$ trap. When the engine A/F is reduced from lean to stoichiometric or rich operation to regenerate or purge the $NO_x$ trap the difference in the time it takes for the upstream and downstream HEGO sensors to switch from a lean to a rich indication provides a quantitative measure of the amount of $NO_x$ that was stored on the $NO_x$ trap during the previous lean period of operation. This measure is related to an estimated amount of $NO_x$ produced by the engine to infer the operating performance or efficiency of the $NO_x$ trap. The difference in the output voltage of the two sensors is compared with a predetermined value to determined when to terminate the $NO_x$ purge. When the efficiency drops below a predetermined value the time that the engine is run in a lean cruise mode is reduced. If the time is reduced below a minimum time interval, a sulfur purge is performed. If sulfur purges are required more often than a predetermined repetition time, the lean cruise mode is terminated and an indicator lamp is energized.

19 Claims, 6 Drawing Sheets

METHOD FOR MONITORING THE PERFORMANCE OF A $NO_x$ TRAP

TECHNICAL FIELD

This invention relates to monitoring the status and performance of exhaust gas purification devices installed in the exhaust passage of an internal combustion engine.

BACKGROUND ART

Presently, $NO_x$ traps are considered a potential exhaust after-treatment technology for lean burn engines. $NO_x$ trap technology typically utilizes alkali metal or alkaline earth materials in combination with platinum in order to store or occlude $NO_x$ under lean operating conditions. The mechanism for $NO_x$ storage involves the oxidation of NO to $NO_2$ over the platinum followed by the subsequent formation of a nitrate complex with the alkaline metal or alkaline earth; under stoichiometric or rich conditions, the nitrate complexes are thermodynamically unstable, and the stored $NO_x$ is released and is catalytically reduced by the excess of CO, $H_2$, and HCs in the exhaust.

If the $NO_x$ trap deteriorates over time, the ability to trap pollutants degrades with resultant increase in atmospheric pollution. Therefore, it is desirable that $NO_x$ trap technology implemented provide an on-board computer driven diagnostic indication of deterioration or degradation of the $NO_x$ trap beyond a predetermined limit.

SUMMARY OF THE INVENTION

In accordance with the present invention, a method and apparatus is provided for making on-board measurements of $NO_x$ trap sorption that permits vehicle on-board computer monitoring and evaluation of $NO_x$ trap performance.

It has been found that during $NO_x$ trap purging, the lean to rich response time ($T_{LR}$) of a HEGO (Heated Exhaust Gas Oxygen) sensor positioned downstream from the $NO_x$ trap is reduced by an amount which is proportional to the quantity of $NO_x$ stored on the trap. As $NO_x$ sorption efficiency increases, more $NO_x$ is stored on the trap, and the $T_{LR}$ of the downstream HEGO sensor increases as well.

Based on the above discovery, the present invention proposes to use this time interval between the initiation of the purge operation and the switching of the downstream HEGO sensor as an indicator of the amount of $NO_x$ which was stored onto the $NO_x$ trap during the previous lean period of operation. Also, this time delay is used in a diagnostic routine for indicating degradation of the $NO_x$ trap performance to an extent requiring attention by service personnel.

More particularly, in a preferred embodiment of the invention two HEGO sensors, one positioned upstream of the $NO_x$ trap, the other positioned downstream of the $NO_x$ trap are employed. When the engine A/F is reduced from lean to stoichiometric or rich operation to regenerate the $NO_x$ trap (i.e. in order to remove the stored $NO_x$ and subsequently convert it to $N_2$), the difference between $T_{LR}$ for the upstream and downstream HEGO sensors provides a quantitative measure of the amount of $NO_x$ that was stored on the $NO_x$ trap during the previous lean period of operation. This estimation of the amount of $NO_x$ stored by the trap is related to a predicted amount of $NO_x$ produced by the engine to infer the operating performance or efficiency of the $NO_x$ trap. Also, the output voltage signal differential between the downstream and the upstream HEGO sensor is checked to determined when to terminate the $NO_x$ purge.

If trap sorption efficiency drops below a predetermined efficiency the lean operation time is reduced in an attempt to improve efficiency. If and when the reduced lean time duration drops below a predetermined minimum lean operation time, a sulfur purge of the trap is desirable and is performed.

If the interval between successive sulfur purges becomes less than a predetermined interval, this is indicative of deterioration of the trap beyond that which can be remedied by the normal purging operations. Accordingly, the lean cruise mode of engine operation is terminated and operation reverts to a closed loop stoichiometric mode and an indicator lamp is energized, so that appropriate remedial action can be taken by the operator.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
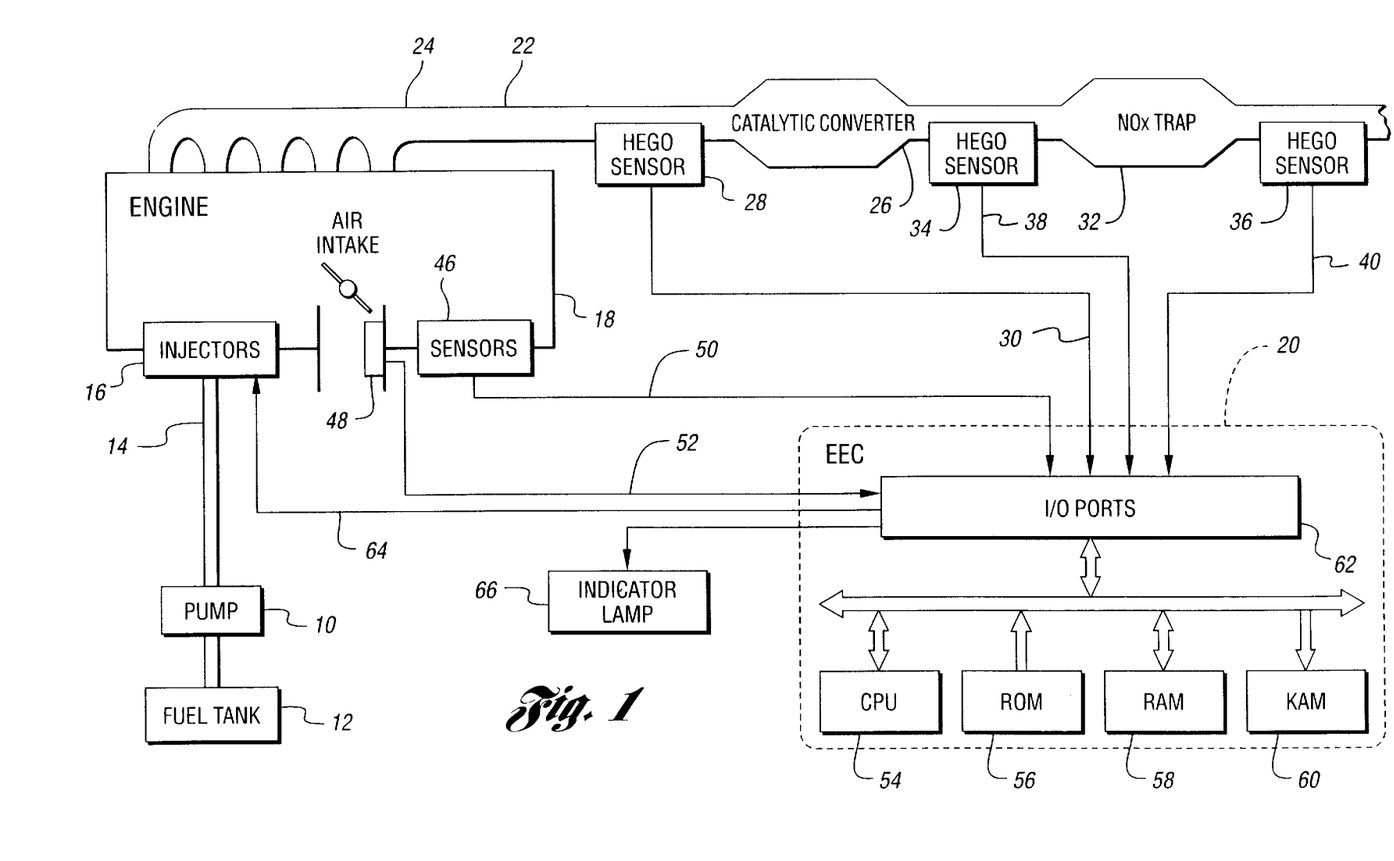
FIG. 1 is an overall block diagram of the control system of the present invention.

Referring now to the drawings and initially to FIG. 1, a block diagram of the present invention is shown. A fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The fuel tank 12 contains liquid fuels, such as gasoline, methanol or a combination of fuel types.

An exhaust system 22, comprising one or more exhaust pipes and an exhaust flange seen at 24, transports exhaust gas produced from combustion of an air/fuel mixture in the engine to a conventional three-way catalytic converter 26. The converter 26 contains catalyst material that chemically alters the exhaust gas to generate a catalyzed exhaust gas. A heated exhaust gas oxygen (HEGO) sensor 28, detects the oxygen content of the exhaust gas generated by the engine 18, and transmits a representative signal over conductor 30 to the EEC 20. A $NO_x$ trap 32 is located downstream of the converter 26 for trapping nitric oxide contained in the exhaust gas exiting the converter. A HEGO sensor 34 detects the oxygen content of the exhaust gas upstream of the trap 28 while a HEGO sensor 36 detects the oxygen content of the exhaust gas downstream of the trap 28. The sensor 34 and 36 transmits signals over respective conductors 38 and 40 to the EEC 20.

Still other sensors, indicated generally at 46, provide additional information about engine performance to the EEC 20, such as crankshaft position, angular velocity, throttle position, air temperature, etc. over conductor 50. The information from these sensors is used by the EEC 20 to control engine operation.

A mass air flow sensor 48 positioned at the air intake of engine 18 detects the amount of air inducted into an induction system of the engine and supplies an air flow signal over conductor 52 to the EEC 20. The air flow signal is utilized by EEC 20 to calculate a value that is indicative of the air mass flowing into the induction system in lbs./min.

The EEC 20 comprises a microcomputer including a central processor unit (CPU) 54, read only memory (ROM) 56 for storing control programs, random access memory (RAM) 58, for temporary data storage which may also be used for counters or timers, and keep-alive memory (KAM) 60 for storing learned values. Data is input and output over I/O ports generally indicated at 62, and communicated internally over a conventional data bus generally indicated at 64. The EEC 20 transmits a fuel injector signal to the injectors 16 via signal line 64. The fuel injector signal is varied over time by EEC 20 to maintain an air/fuel ratio determined by the EEC 20. An indicator lamp generally indicated at 66 is controlled by the EEC 20 to provide an indication of the condition of the $NO_x$ trap 32 as determined by input data from the various sensors as described more fully hereinafter.

The program stored in ROM 58 implements an air/fuel strategy where the engine is operated in lean mode or relatively high air to fuel ratio (A/F) for fuel economy under certain engine speed/load conditions. During the lean mode, $NO_x$ and $SO_x$ accumulates in the $NO_x$ trap. After predetermined criteria are met, indicative of substantially total sorption of the trap 32, the A/F is switched to a relatively rich mixture to purge the trap of $NO_x$. After the purge node is completed the EEC returns to the lean mode of operation. Alternatively, the EEC program may call for a stoichiometric mode of operation instead of the rich mode for purging the trap of $NO_x$.

Figure 2:
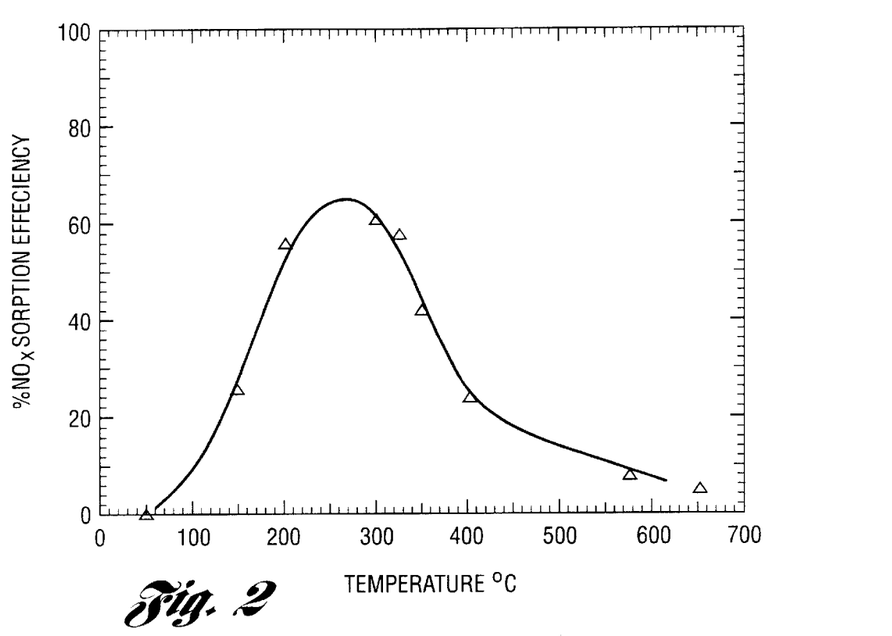
FIGS. 2 and 3 graphically demonstrate the similar quantitative relationship between % $NO_x$ sorption efficiency and the lean to rich switch time of a downstream oxygen sensor over a range of temperature.
Figure 3:
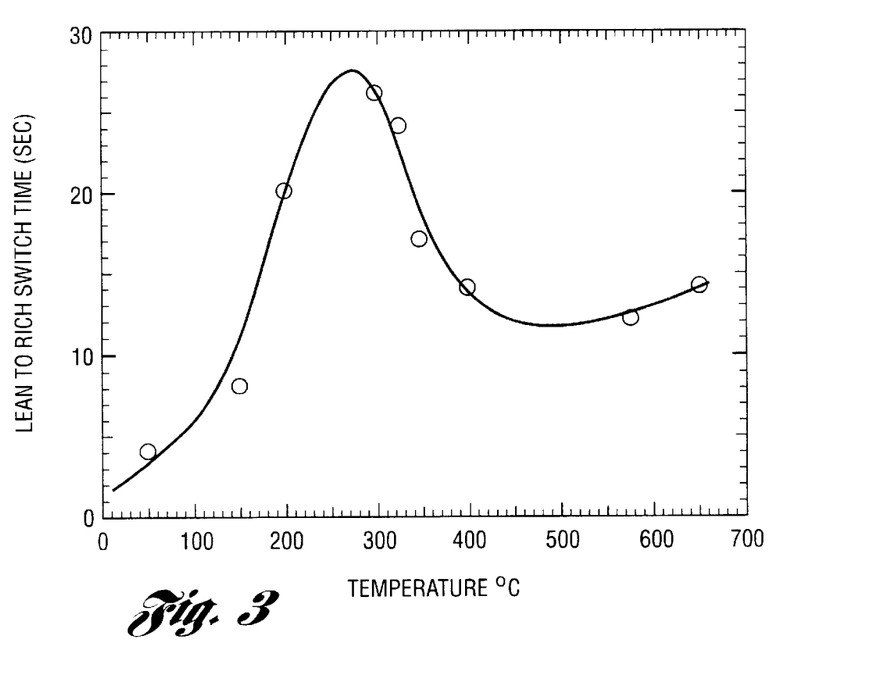
Figure 4:
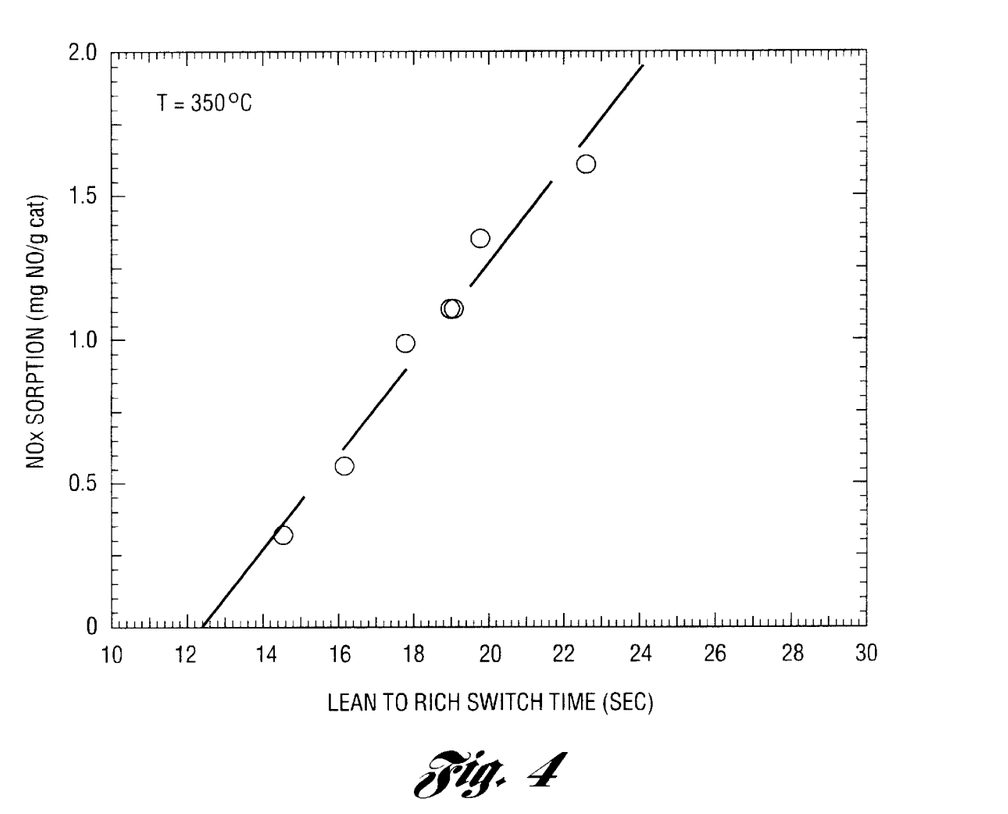
FIG. 4 shows that the lean to rich switch time of a downstream oxygen sensor is substantially directly proportional to the amount of $NO_x$ that is stored on the trap.

Referring now FIGS. 2, 3, and 4, the relationship between lean to rich switch time ($T_{LR}$) of a HEGO sensor placed downstream of a $NO_x$ trap and the quantity of $NO_x$ stored on the trap is graphically illustrated. FIGS. 2 and 3 contrast $NO_x$ trap sorption efficiency as a function of temperature to the corresponding lean to rich switch time ($T_{LR}$) of a HEGO sensor placed downstream of the $NO_x$ trap. The $NO_x$ trap sorption efficiency and the downstream HEGO's $T_{LR}$ exhibit very similar qualitative behaviors. As $NO_x$ sorption efficiency increases, more $NO_x$ is stored on the trap, and the $T_{LR}$ of the downstream HEGO sensor increases as well.

FIG. 2 shows the average $NO_x$ sorption efficiency as a function of temperature during a 5 minute lean cycle for a conventional strontium based $NO_x$ trap. With increasing temperature, $NO_x$ sorption efficiency first increases, reaches a maximum level at approximately 300°–350° C., and then decreases. These measurements were made in a laboratory flow reactor with a simulated exhaust gas consisting of 10% $H_2O$, 10% $CO_2$, 500 ppm $NO_x$, 7% $O_2$, in a balance of $N_2$. To purge or regenerate the $NO_x$ trap, the $O_2$ in the exhaust gas was turned off and replaced with 0.58% CO. The space velocity was 30,000 hr–1.

FIG. 3 shown a graph of the corresponding lean to rich switch time ($T_{LR}$) for a conventional Exhaust Gas Oxygen Sensor (EGO) placed downstream of the $NO_x$ trap. $T_{LR}$ is defined as the time period between the initiation of the $NO_x$ trap purge and the observation of a minimum 0.5 volt sensor output signal. The $NO_x$ trap sorption efficiency and $T_{LR}$ display very similar qualitative behaviors. As $NO_x$ trap sorption efficiency increases, more $NO_x$ is stored onto the trap, and the $T_{LR}$ of the downstream EGO sensor increases as well. It is believed that the $NO_x$ which is stored onto the trap behaves very much like stored oxygen and simply reacts with the CO and $H_2$ in the exhaust during purging hence delaying rich breakthrough.

FIG. 4 shows a graph of $NO_x$ storage as a function of $T_{LR}$ at 350° C. The lean operating period was varied in order to vary the quantity of $NO_x$ stored onto the trap. At a given temperature, the $T_{LR}$ which is observed during purging of the $NO_x$ trap is seen to be directly proportional to the quantity of $NO_x$ which was stored onto the trap during the previous lean period of operation. The present invention utilizes this relationship between $NO_x$ sorption and $T_{LR}$ to control trap purge time, to determine whether the time interval of lean operation should be reduced, and to determine when the trap should be replaced. Also, this relationship is used to determine when to desulfate the trap to rid the $NO_x$ trap of $SO_x$.

Figure 5:
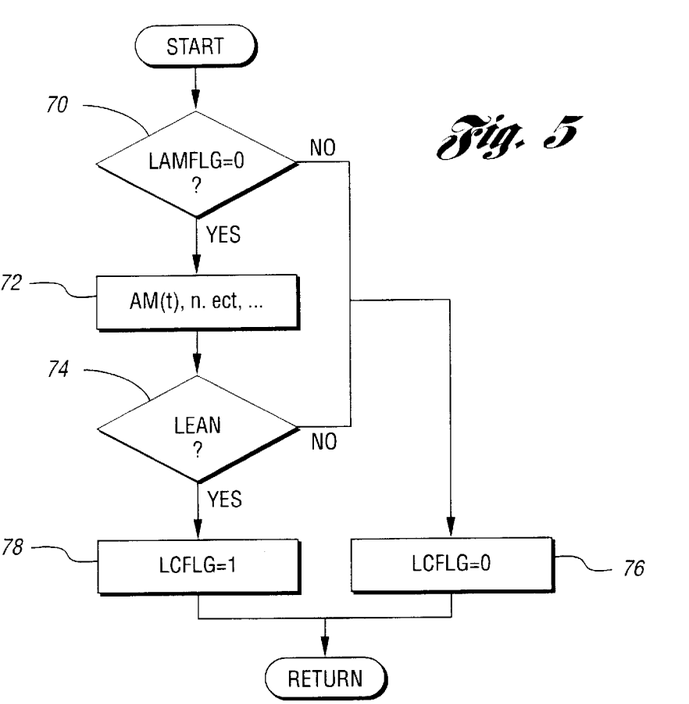
FIG. 5 is a flowchart depicting the conditions under which a lean cruise mode of engine operation is entered.

Referring now to FIG. 5, a flowchart depicting the criteria for entering the lean cruise mode of operation is shown. The lean cruise mode of operation includes an open loop fuel control mode where the engine is operated with a lean fuel mixture of for example 20 parts air to 1 part fuel. The lean cruise mode of operation also includes a closed loop fuel control mode, which is periodically entered from the open loop mode, where the engine is operated at a stoichiometric air fuel ratio of about 14.5 to 1 for a time interval sufficient to purge the $NO_x$ trap of $NO_x$ prior to return to the lean mode. There is a flag LCFLG that reflects the status of the lean cruise mode. While in the lean cruise mode the engine is normally operating in an open loop lean mode and is periodically placed in a closed loop stoichiometric mode or slightly open loop rich mode for purging the $NO_x$.

At block 70, an indicator lamp flag LAMFLG is checked. This flag is set whenever the EEC 20 determines that the $NO_x$ trap has degraded to a point where the normal $SO_x$ purging operations are no longer sufficient and the $NO_x$ trap requires further attention and may need to be replaced. Such a condition would be indicated to the vehicle operator by the energized state of the indicator lamp 66 and the occurrence of $NO_x$ degradation would be logged in the keep alive memory 60. IF LAMFLG is reset (0), indicating normal $NO_x$ trap operation, then at block 72 the air mass inducted into the engine, as well as other engine operating conditions, such as speed and engine coolant temperature, are measured to determined the proper engine air fuel ratio (A/F). If degradation of the $NO_x$ trap has occurred (LAMFLG=1), or if conditions are such that lean operation is not desirable, as determined by the decision block 74, then a lean cruise flag LCFLG is reset (0) at block 76 and the subroutine returns to the main program. Otherwise, the lean cruise flag LCFLG is set (1) at block 78 and the subroutine returns to the main program. The lean cruise mode of operation includes operating at a lean A/F for a length of time $T_1$, during which time the engine speed and load are used to estimate the cumulative amount of $NO_x$ produced by the engine. After the time interval $T_1$ has expired, a purge of the $NO_x$ trap is performed by operating the engine at a relatively rich A/F for a purge interval before returning to the relatively lean operation.

Figure 6A:
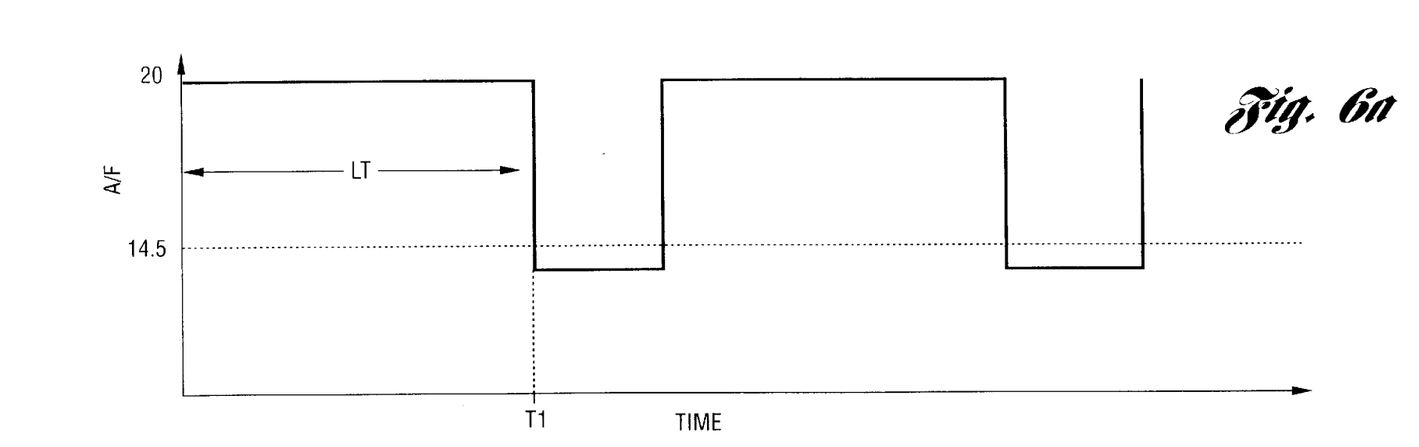
FIGS. 6a and 6b are timing diagrams showing the timing of the initiation and termination of the $NO_x$ purge operation.
Figure 6B:
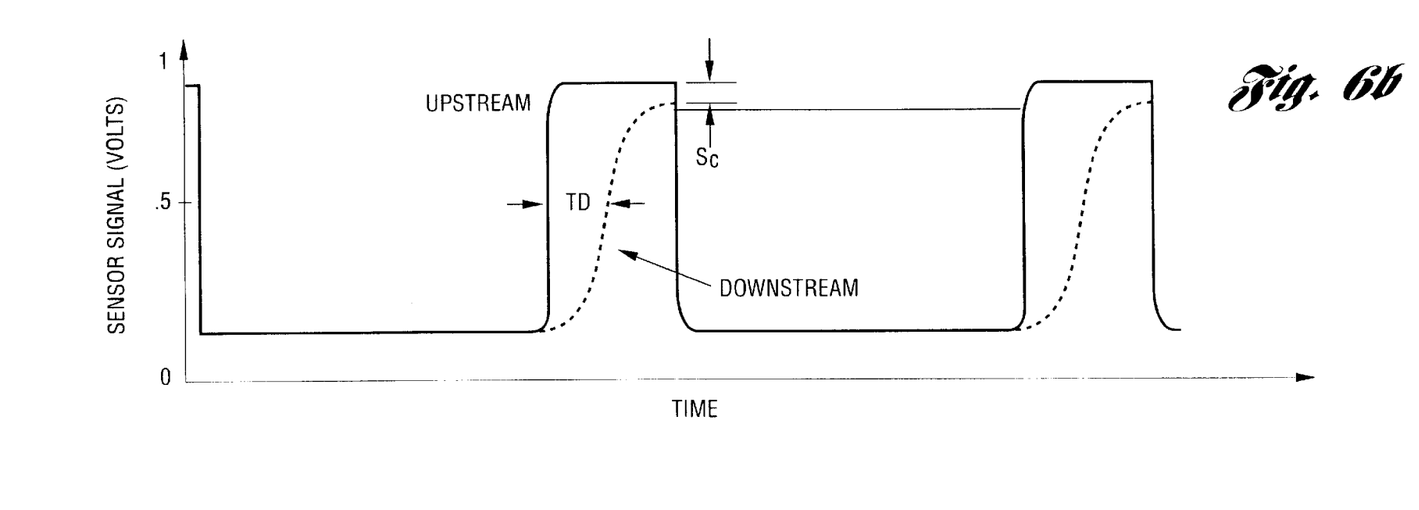

A timing diagram of the $NO_x$ purge operation is shown in FIGS. 6a and 6b. FIG. 6a shows an air/fuel ratio schedule as a function of time, while the engine is operation in a lean cruise mode of operation at an open loop air/fuel ratio of 20.

When lean time LT becomes greater than T1 a purge of the trap 32 is appropriate so the air/fuel ratio is stepped from a lean value to a slightly rich value, where an air/fuel ratio of 14.5 represents stoichiometry. When this occurs the upstream sensor 34 switches immediately from low voltage to a high voltage, as shown in FIG. 6b. As indication by the dotted line, the switching of the downstream sensor is delayed by the amount TD. The time delay required for the downstream sensor 36 to reach a predetermined voltage, for example, one-half volt as shown in FIG. 6b is measured (block 100). When the output voltage difference between the downstream sensor 36 and upstream sensor 34 reaches a predetermined value $S_c$ (block 108) the $NO_x$ purge is terminated and lean operation is resumed.

Figure 7:
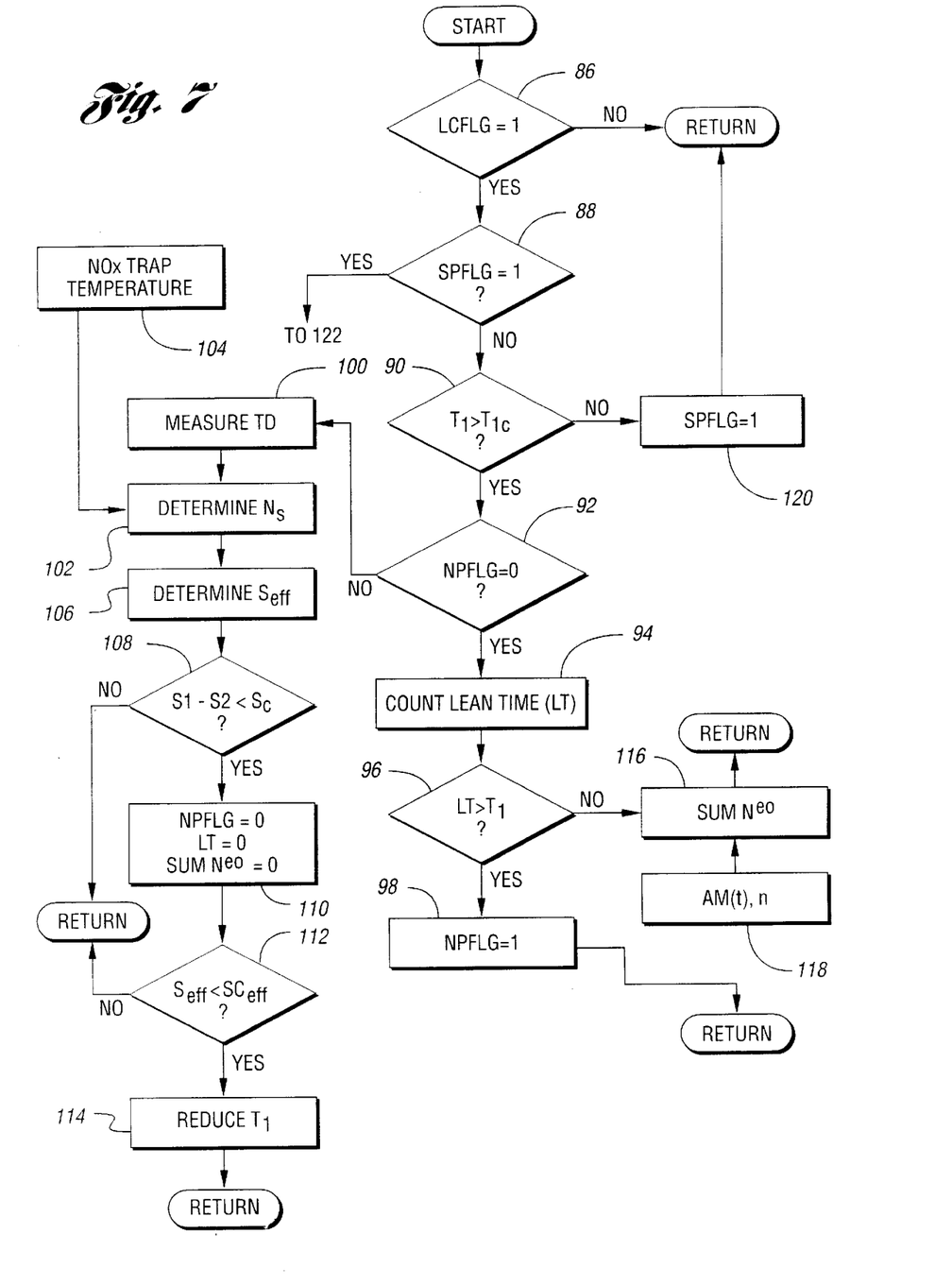
FIG. 7 is a flowchart depicting the conditions under which the time interval for lean mode is adjusted.

Referring now to FIG. 7, a flowchart depicting the criteria for purging the $NO_x$ trap and the calculation of $NO_x$ storage efficiency, is shown. At block 86, LCFLG is checked to determined if the system is being operated in a lean cruise mode. If not, the routine returns to the main program. If so, a sulfur purge flag SPFLG is checked at decision block 88. If SPFLG is set (1) then a sulfur purge of the trap is initiated as will be described hereinafter. If SPFLG is reset (0), the time duration of the lean mode of operation $T_1$, is compared with a predetermined minimum time period $T_{1c}$. Unless $T_1$ is greater than this predetermined time interval $T_{1c}$, lean cruise operation may need to be terminated. The time interval $T_1$ is initially a predetermined value and will remain so as long as $NO_x$ trap storage efficiency remains above a predetermined or required efficiency value, but $T_1$ will be reduced as explained below in order to maintain the required efficiency. If it is determined at block 90 that $T_1$, is not greater than the predetermined time period $T_{1c}$, this may indicate that the $NO_x$ trap is deteriorated due to the adsorption of $SO_x$, an undesirable but unavoidable process. Accordingly, the sulfur purge flag is set and the lean and $NO_x$ flags are reset at block 120 and the operation returns to the main program. The next time through this routine a sulfur purge will be called for at the decision block 88.

If $T_1$ is greater than $T_{1c}$, then the conditions of a $NO_x$ purge flag (NPFLG), is checked at decision block 92. If the $NO_x$ purge flag is reset, that is, the engine is operation in a lean mode, lean time LT is incremented at block 94 and compared to $T_1$ at block 96. If the lean time is not greater than the predetermined time period for lean operation as determined by the block 96, then an estimate of the amount of $NO_x$ which has been introduced to the trap since the last purge is made in block 116. SUM $N^{e0}$, determined in block 116, is a prediction of cumulative $NO_x$ produced by the engine based on air mass inducted into the engine and engine speed as input from block 118. If, on the other hand, the measured lean operating time is greater than the set time period for lean operation $T_1$, as determined at block 96, the NPFLG flag is set as shown at block 98 and the $NO_x$ purge operation is begun by switching from a lean mode to a relatively rich A/F. The next time through the loop at block 92 the NO path will be taken.

During the $NO_x$ purge, the time delay that occurs between switching of the front and rear EGO sensors, due to $NO_x$ accumulation, is measured at block 100. Based on this time delay, the amount of $NO_x$ stored on the trap $N_s$ is determined at block 102 as a function of the trap temperature (FIG. 4), which is input from block 104. The trap temperature may be obtained in several known ways such as from a temperature sensor or based on sensed air mass or estimated by way of another input.

The $NO_x$ storage efficiency $S_{eff}$ is determined at block 106 based on the ratio $N_s$/SUM $N^{e0}$. In other words, storage efficiency is ratio of the amount of $NO_x$ stored in the trap to the amount of $NO_x$ generated by the engine. At decision block 108, the voltage S2, of the downstream HEGO sensor 36 is subtracted from the voltage S1, of the upstream HEGO sensor 34 and the difference is compared to a predetermined difference $S_c$ to determine whether it is time to terminate the $NO_x$ purge. As soon as the difference drops below the predetermined difference value, the purge may be considered complete and is terminated and the $NO_x$ purge flag NPFLG is reset (0), the lean cruise time counter or timer LT is reset, and the predicted $NO_x$ value SUM $N^{e0}$ is reset at block 110.

If the $NO_x$ storage efficiency is less than a predetermined $NO_x$ storage efficiency $SC_{eff}$ as determined by the block 112, then the time period for lean operation, $T_1$, is reduced toward $T_{1c}$, by a predetermined amount, at block 114. If the lean time interval has been reduced below the predetermined time period $T_{1c}$ as determined by the block 90 then the sulfur purge flag (SPFLG) is set as indicated in the block 120. With SPFLG=1, the next time through this routine a sulfur purge will be called for at the decision block 88.

Figure 8:
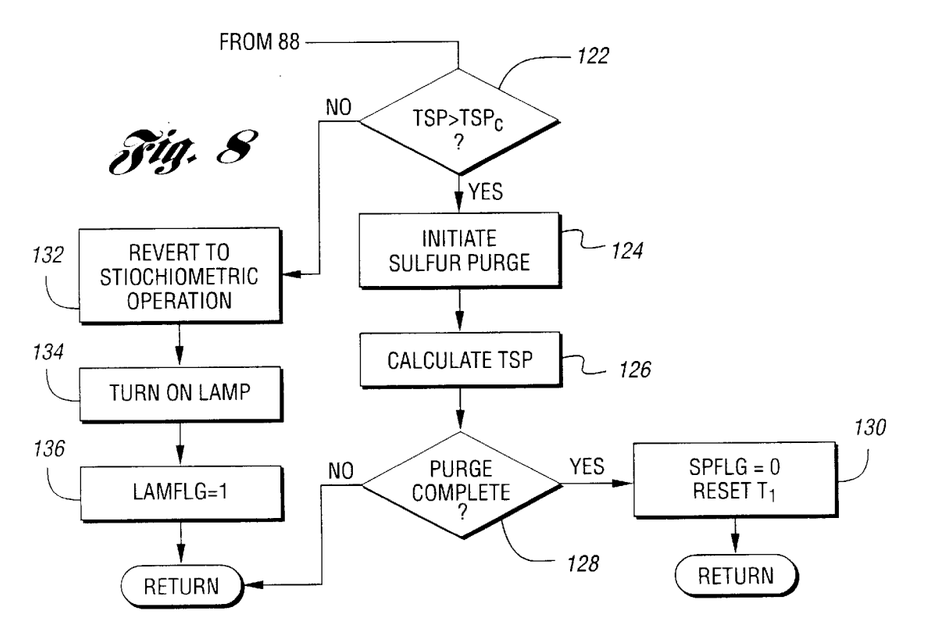
FIG. 8 is a flowchart depicting the conditions under which a sulfur purge is carried out as well as the circumstances under which the lean cruise mode is terminated and an indicator lamp is energized.

Referring now to FIG. 8, the subroutine for carrying out a sulfur purge and on-board $NO_x$ trap diagnostics is shown. Sulfur purge is accomplished by raising the $NO_x$ trap temperature to a predetermined level, for example above 550 degrees C, while exposing the $NO_x$ trap to a rich exhaust gas mixture. Additional air from a separate air supply and pump may be introduced under EEC control to achieve desired trap temperature in order to generate an exotherm on the $NO_x$ trap 32 and hence achieve the desired temperature.

If the lean cruise flag (LCFLG) is set (1), and the sulfur purge flag (SPFLG) is set (1), as determined by blocks 86 and 88 of FIG. 6, a sulfur purge is initiated at block 124, unless the time period between successive sulfur purges (TSP) is less than a predetermined time period (TSPC) as determined by the block 122. At block 126 the time since the last sulfur purge (TSP) is calculated. When the purge is completed as determined by block 128, the sulfur purge flag (SPFLG) is reset (0) at block 130 and the subroutine returns to the main program. Completion of sulfur purge would be based on the trap 32 being above a threshold temperature for a predetermined time period or on other criteria. On the other hand, if the time period between sulfur purges is less than the predetermined time period TSPC, this frequent need to perform a $SO_x$ purge is an indication that the trap is not being properly purged and may be defective. In this event the system reverts to a stoichiometric operation at block 132, the indicator lamp is energized at 134, and the associated flag (LAMFLG) is set at 136. This will cause the lean cruise flag LCFLG to be reset (0) at block 76 (FIG. 5) the next time a decision is called for at block 70. Thus, a diagnostic lamp is energized whenever the $NO_x$ trap exhibits an apparent permanent loss in activity which is not alleviated by the $NO_x$ and $SO_x$ purging operations normally intended to revitalize the trap.

While two HEGO sensors 34 and 36 are shown, the sensor 34 could be eliminated. In this particular case, the time interval measured at block 100 would be simply the time delay between the initiation of the $NO_x$ purge (switching engine A/F ratio from lean to rich or stoichiometric) and the lean to rich switch of the rear HEGO sensor 36. Also, a minimum output signal or voltage of sensor 36 would be checked at block 108 to determine that an adequate $NO_x$ purging had been completed. Further, the $NO_x$ purging operation may commence based on other criteria than a predetermined time interval in lean mode. This change would involve a modification of the operations performed at blocks 90, 96 and 114 to reflect the new criteria.

While the best mode for carrying out the present invention has been described in detail, those familiar with the art to which this invention relates will recognize various alternative designs and embodiments for practicing the invention as defined by the following claims.

What is claimed is:

1. A method of monitoring performance of a $NO_x$ trap disposed in an exhaust passage of an internal combustion engine, comprising a sequence of the following steps:

switching the operation of said engine from a relatively lean mode of operation to a relatively rich mode of operation to purge said $NO_x$ trap;

detecting a change in the content of the exhaust gas composition at a predetermined exhaust passage location;

determining the amount of $NO_x$ stored onto the $NO_x$ trap during the previous lean period of operation as a function of the elapsed time between said switching step and said detecting step;

estimating the amount of $NO_x$ produced by the engine since the last purge; and determining the sorption efficiency of said $NO_x$ trap by dividing the quantity of $NO_x$ stored onto the trap by the estimated quantity of $NO_x$ produced by the engine.

2. The method of claim 1 wherein said predetermined location is downstream of said trap.

3. The method of claim 2 wherein the change detected is in the oxygen content of the exhaust gas.

4. The method of claim 1 wherein the change detected is in the oxygen content of the exhaust gas.

5. The method of claim 2 further comprising the step of terminating said purge when the exhaust gas content at said location satisfies a predetermined criteria.

6. The method of claim 5 wherein said predetermined criteria is the exhaust gas oxygen content at said location reaching a predetermined value.

7. The method of claim 1 including the further step of reducing the time duration of the lean mode of operation if the sorption efficiency is less than a predetermine minimum efficiency.

8. The method of claim 7 including the further step of providing a performance indicator if the time duration of said lean mode of operation is reduced below a predetermined minimum time interval.

9. The method of claim 8 including the further step of carrying out a sulfur purge operation if the duration of said lean mode of operation is reduced below a predetermined minimum time interval.

10. The method of claim 9 including the further steps of energizing an indicator if the time interval since the last sulfur purge is less than a predetermined time interval.

11. The method of claim 9 including the further step of reverting to a stoichiometric mode of engine operation and energizing an indicator if the time interval since the last sulfur purge is less than a predetermined time interval.

12. A system for monitoring performance of a $NO_x$ trap disposed in an exhaust passage of an internal combustion engine, comprising:

an exhaust gas sensor disposed downstream from said trap;

means for generating a command to switch the operation of said engine from a relatively lean A/F to a relatively rich A/F to purge said $NO_x$ trap;

means for detecting the switching of said sensor from a first to a second state in response to the exhaust gas content;

means for measuring the time interval between the initiation of said command and the detection of said switching;

means for determining the sorption of said $NO_x$ trap as a function of said time interval;

means for estimating the amount of $NO_x$ produced by the engine; and means for determining the sorption efficiency of said $NO_x$ trap based on the ratio of said sorption to said amount.

13. The system defined in claim 12 wherein said means for generating a command terminates said relatively rich A/F and initiates said relatively lean A/F thereby terminating purging of said $NO_x$ trap when the voltage output of said sensor reaches a predetermined value.

14. A system for monitoring performance of a $NO_x$ trap disposed in an exhaust passage of an internal combustion engine, comprising:

a first exhaust gas oxygen sensor disposed upstream from said trap;

a second exhaust gas oxygen sensor disposed downstream from said trap;

said first and second sensor producing respective outputs indicative of the oxygen content of the exhaust gas;

air fuel ratio control means for switching the operation of said engine from a relatively lean mode of operation to a relatively rich mode of operation to initiate a purge of said $NO_x$ trap;

said control means detecting the switching of said first and second sensors from a relatively high exhaust gas oxygen content state to a relatively low exhaust gas oxygen content state following switching to said relatively rich mode of operation;

said control means determining the sorption of said $NO_x$ trap as a function of the temperature of said trap and the time interval between the switching of said first and second sensors.

15. The system of claim 14 wherein said control means terminates said purge when the difference between the outputs of said first and second sensor is less than a predetermined value.

16. The system of claim 15 wherein said control means estimates the amount of $NO_x$ produced by the engine as a function of engine speed and load; and said control means determines the sorption efficiency of said $NO_x$ trap as a function of said time interval and the estimate of the $NO_x$ produced by the engine.

17. The system of claim 16 wherein said control means reduces the time duration of the lean mode of operation if the sorption efficiency is less than a predetermined minimum efficiency.

18. The system of claim 17 wherein said control means carries out a sulfur purge operation if the time duration of said lean mode of operation is below a predetermined minimum time interval and the time interval since the last sulfur purge is greater than a predetermined time interval.

19. The system of claim 18 wherein said control means reverts to a relatively stoichiometric mode of engine operation and causes an indicator to be energized if the time interval since the last purge is not greater than said predetermined time interval.

* * * * *